United States Patent
Ruffini et al.

(10) Patent No.: US 10,925,024 B2
(45) Date of Patent: Feb. 16, 2021

(54) RIBS BASED SYNCHRONIZATION SERVICE

(71) Applicant: Telefonaktiebolaget LM Ericsson (publ), Stockholm (SE)

(72) Inventors: Stefano Ruffini, Rome (IT); Angelo Centonza, Stockholm (SE); Magnus Sandgren, Staffanstorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/089,088

(22) PCT Filed: Mar. 31, 2017

(86) PCT No.: PCT/SE2017/050311
§ 371 (c)(1),
(2) Date: Sep. 27, 2018

(87) PCT Pub. No.: WO2017/171621
PCT Pub. Date: Oct. 5, 2017

(65) Prior Publication Data
US 2019/0124612 A1    Apr. 25, 2019

Related U.S. Application Data

(60) Provisional application No. 62/317,147, filed on Apr. 1, 2016.

(51) Int. Cl.
*H04W 56/00* (2009.01)
(52) U.S. Cl.
CPC .............. *H04W 56/0015* (2013.01)

(58) Field of Classification Search
CPC ................................. H04W 56/0015
USPC ........................................ 370/350
See application file for complete search history.

(56) References Cited

U.S. PATENT DOCUMENTS

| | | | |
|---|---|---|---|
| 9,119,112 B1* | 8/2015 | Hou | H04W 48/20 |
| 2014/0355597 A1* | 12/2014 | Yeh | H04W 56/0045 370/350 |
| 2015/0043561 A1* | 2/2015 | Xia | H04W 12/06 370/338 |
| 2017/0055237 A1 | 2/2017 | Byun et al. | |

(Continued)

FOREIGN PATENT DOCUMENTS

WO    WO 2015/170901 A1    11/2015

OTHER PUBLICATIONS

Notification of Transmittal of the International Search Report and the Written Opinion of the International Searching Authority for International Application No. PCT/SE2017/050311 dated Jun. 28, 2017.

(Continued)

*Primary Examiner* — Sai Ming Chan
(74) *Attorney, Agent, or Firm* — Sage Patent Group

(57) ABSTRACT

In one aspect, a network node configured to arrange a synchronization service for a target network access node receives a service request from the target network access node for a synchronization service to be provided to the target network access node and selects the synchronization source node, responsive to the service request. The network node sends a response towards the target network access node regarding the synchronization service to be provided by the synchronization source node.

17 Claims, 16 Drawing Sheets

(56) References Cited

U.S. PATENT DOCUMENTS

2017/0134961 A1* 5/2017 Ghosh .................. H04W 16/14
2018/0176874 A1* 6/2018 Wang ................ H04W 56/0015

OTHER PUBLICATIONS

Ericsson, "Evaluation of Solution3 for Network Based Synchronisation," 3GPP TSG-RAN WG3 Meeting #91, R3-160360, dated Feb. 15-19, 2016, 3 pages.

Ericsson et al., "Propagation delays in Radio Interface Based Synchronisation," 3GPP TSG-RAN WG3 Meeting #87bis, R3-150788, dated Apr. 20-24, 2015, 3 pages.

Institute for Information Industry (III), "Performance of D2D synchronization source selection and D2DSS transmission," 3GPP TSG-RAN WG1 Meeting #76bis, R1-141498, dated Mar. 31-Apr. 4, 2014, 5 pages.

3GPP TR 36.922 V13.0.0, "3rd Generation Partnership Project; Technical Specification Group Radio Access Network; Evolved Universal Terrestrial Radio Access (E-UTRA); TDD Home eNode B (HeNB) Radio Frequency (RF) equirements analysis (Release 13)," Technical Report, Jan. 2016, 75 pages.

Huawei,"TR 36.898, v0.5.0," R3-152900, 3GPP TSG-RAN3 Meeting #90, Anaheim CA, USA, Nov. 16-20, 2015, 16 pages.

ETSI TS 36.413 V12.5.0, "LTE; Evolved Universal Terrestrial Radio Access Network (E-UTRAN); S1 Application 3rotocol (S1AP)," Release 12, Technical Specification, Apr. 2015, 451 pages.

ETSI TS 36.300 V12.5.0, "LTE; Evolved Universal Terrestrial Radio Access (E-UTRA) and Evolved Universal Terrestrial Radio Access Network (E-UTRAN); Overall description; Stage 2," Release 12, Technical Specification, Apr. 2015, 255 pages.

3GPP TS 32592 V13.0.0, "3rd Generation Partnership Project; Technical Specification Group Services and System Aspects; Telecommunication management; Home enhanced Node B (HeNB) Operations, Administration, Maintenance and Provisioning (OAM &P); Information model for Type 1 interface HeNB to HeNB Management System (HeMS) (Release 13)," Technical Specification, Dec. 2014, 94 pages.

3GPP TR 36.898 V1.0.0, "3rd Generation Partnership Project; Technical Specification Group Radio Access Network; Network Assistance for Network Synchronization (Release 13)," Technical Report, Dec. 2015, 15 pages.

* cited by examiner

RIBS BASED SYNCHRONIZATION SERVICE

CROSS REFERENCE TO RELATED APPLICATION

This application is a 35 U.S.C. § 371 national stage application of PCT International Application No. PCT/SE2017/050311, filed on Mar. 31, 2017, which claims priority to U.S. Provisional Patent Application No. 62/317,147, filed on Apr. 1, 2016, the disclosures and content of which are incorporated by reference herein in its entirety.

TECHNICAL FIELD

The present invention generally relates to wireless communication networks, and particularly relates to network nodes that arrange a synchronization service for a target network access node, provide a synchronization service to a target network access node and/or synchronize communications in the wireless communication network.

BACKGROUND

The $5^{th}$ generation mobile network (5G) landscape is likely to increase the importance of maintaining accurate and reliable timing, such as time synchronization, throughout a wireless communication network. In addition to the increased importance of synchronization in mobile access (e.g., Time Division Duplex, or TDD), there are many "networked society" or Internet of Things (IoT) applications that will require synchronization.

Global navigation satellite systems (GNSS) and global positioning systems (GPS) are traditionally used to distribute accurate time synchronization among nodes in a network. Accurate timing may also be delivered over the network via Precision Time Protocol (PTP) (IEEE1588), which is having increasing success with computer networks.

Solutions based on synchronization over terrestrial radio are becoming more popular and Network Listening is one of these solutions. FIG. 1 illustrates Network Listening, which is presented in 3GPP technical report TR 36.922 and the corresponding signaling messages are specified in technical standards TS 36.413 and TS 32.592. Network Listening was defined by 3GPP to deliver synchronization over the radio interface, mainly to address the needs of TDD femtocells. For example, in FIG. 1, an eNB of a macro cell provides synchronization signals (PSS and SSS) over primary and secondary synchronization channels (PSCH and SSCH) to a home eNB (HeNB) of a femto cell. The eNB may derive its timing from another synchronized eNB. The cell used as a clock reference is not required to be a macro cell connected to GNSS since the scheme allows for multi-hop eNB-to-eNB. By decoding the PSS, SSS and/or the cell-specific reference signal (CRS), an eNB or HeNB can relate the timing of the received signal to its internal timing and adjust the internal timing and frequency to the neighboring cells.

FIG. 2 shows an example of Over the Air Synchronization (OTA-S). The propagation delays (t1, t2) must be known in order to adjust the timing. Since the propagation speed is 300 m per microsecond and the timing requirement for TDD is +/−1.5 microsecond at the ARP, the propagation delay must be known with an accuracy of approximately 0.5 us~150 meters or better. Positioning reference signals (PRS) have better properties for synchronization and should be preferred, especially since it allows muting and thereby better signal to noise ratios (SNR).

FIG. 3 illustrates Radio Interface Based Synchronization (RIBS) that is used between eNBs. Here, clock stratum information and location information should be retrieved by the eNB. Clock stratum information may include a number of hops from the synchronization source. In practice, it is an indication of whether or not the neighboring eNB is taking its clock source from GPS. Note that stratum pertains to eNB to eNB signaling and is thus not known by a user equipment (UE). The UE is just a "slave" and synchronizes to the eNB, whatever the stratum. Location information is needed to calculate propagation delay.

The means to deliver the location information and to control for interfering eNBs is being defined. In particular, 3GPP TS 36.300 (E-UTRAN Overall Description), provides the following definition:

Radio-interface based synchronization (RIBS) enables an eNB to monitor the reference signals of another eNB for the purpose of over the air synchronization by means of network listening. This requires OAM to configure the eNBs with reference signal information, i.e. pattern, periodicity and offset, where the reference signals are available. The OAM should coordinate the reference signal information, for example via one to one mapping between stratum level and reference signal. To improve the hearability of reference signals, the listening eNB may request the interfering eNB(s) to enable subframe muting by means of network signaling.

This enhancement has been introduced in Release 12 and is illustrated in FIG. 3. The eNB can request synchronization information from a neighboring eNB and request interfering cells to mute certain subframes. Currently, network interface-based signaling for over the air synchronization purposes is enabled by means of the S1: eNB Configuration Transfer and S1: MME Configuration Transfer procedures, according to the steps outlined in FIG. 3.

FIG. 3 shows S1 signaling to support radio interface based synchronization. At a first step, an eNB1 302 generates an eNB Configuration Transfer message containing a self-organizing network (SON). Information Transfer information element (IE) with a SON Information Request IE set to "Time Synchronization Info." At a second step, the MME 304 receiving the eNB Configuration Transfer message forwards the SON Information Transfer IE towards a target eNB2 306 indicated in the IE by means of the MME 304 Configuration Transfer message. Another eNB3 308 may also receive a message.

At a third step, the receiving eNB2 306 may reply with an eNB Configuration Transfer message towards eNB1 302 including a SON Information Reply IE with the Timing Synchronization Information IE, which consists of a Stratum Level and a Synchronization Status of the sending node (additionally the message can include information about availability of the muting function and details of already active muting patterns). These two parameters can be defined as follows:

Stratum Level: indicates the number of hops between the node to which the stratum level belongs to the source of a synchronized reference clock. That is, when the stratum level is M, the eNB is synchronized to an eNB whose stratum level is M−1, which in turn is synchronized to an eNB with stratum level M−2 and so on. The eNB with stratum level 0 is the synchronization source.

Synchronization Status: indicates whether the node signaling such parameter is connected (via the number of hops stated in the Stratum Level) to a synchronized reference clock (e.g., a GPS source) or to a non-synchronized reference clock (e.g., a drifting clock).

At a fourth step, the MME 304 receiving the eNB Configuration Transfer message from eNB2 306 forwards it to eNB1 302 by means of the MME Configuration Transfer message. At a fifth step, eNB1 302 selects the best available cell's signal as a synchronization source and identifies whether there are neighbor cells interfering with the synchronization source signal. If such interfering cells are identified, such as in eNB2's 306 cells, eNB1 302 sends an eNB Configuration Transfer including information about the cell selected as the synchronization source as well as a request to activate muting on certain specific cells. The information on the synchronization source cell may include the synchronization reference signal (RS) period, an offset, and the synchronization node's stratum level.

At a sixth step, the MME 304 receiving the eNB Configuration Transfer message from eNB1 302 forwards it to eNB2 306 by means of the MME Configuration Transfer message. At a seventh step, eNB2 306 determines whether the muting request from eNB1 302 can be fulfilled and activates muting patterns that are most suitable to such request. The eNB2 306 responds with an eNB Configuration Transfer message containing muting pattern information such as muting pattern period (period of muted subframes) and muting pattern offset.

At an eighth step, the MME receiving the eNB Configuration Transfer message from eNB2 306 forwards it to eNB1 302 by means of the MME Configuration Transfer message. At a ninth step, if eNB1 302 determines that muting at eNB2's 306 cells is no more needed, eNB1 302 can trigger an eNB Configuration Transfer message containing a muting deactivation request.

At a tenth step, the MME 304 receiving the eNB Configuration Transfer message from eNB1 302 forwards it to eNB2 306 by means of the MME Configuration Transfer message. The eNB2 306 may then deactivate the muting pattern, i.e., it may freely transmit on the subframes previously muted. It should be noted that the RIBS functions are standardized in 3GPP Release 12 and pattern muting activation should enable an enhancement of the synchronization source signal with respect to the case where interference from aggressor cells is not mitigated. When using PRS signals, muting one's own transmission for Frequency Division Duplex (FDD) is necessary during the PRS reception.

With regard to delivering location information, it was proposed that transmission point location information be added in the Time Synchronization Information IE in the form of location coordinates associated to a list of cells served by the corresponding transmission point.

In many cases, it is not possible to use PTP to distribute accurate timing as it requires a backhaul network with specific hardware and software functions implemented in every node (see G.827x series). Some of the main issues include previously deployed legacy nodes that do not support PTP, and the fact that it is not possible to deliver the accurate timing across network boundaries.

GPS (and in general GNSS) as a timing source is not considered to be a sufficient or feasible solution in many cases. One of the critical issues with GNSS systems is that it requires installation of an antenna with a view of the sky. However, many applications requiring accurate timing will be indoors, including small or femto cells. Because of this, solutions based on synchronization over terrestrial radio, such as Network Listening, are becoming more popular.

SUMMARY

However, one issue with Network Listening is that small cells may not see a radio signal delivered by a base station of a macro cell operated by the same operator. In general, RIBS may need to be enabled in cases where signals are not available from the operator or where current signaling over the S1/X2 interfaces is not possible.

Embodiments of the present invention involve providing a synchronization service (i.e., accurate timing offered by another operator) in the context of Network Listening. This may include exploiting the potential characteristics of beamforming when applied to the synchronization use case. The relevant parameters allowing for enhanced performance are provided by means of a centralized entity that orchestrates the synchronization service. The embodiments make it possible to get synchronization from other operator macro cells with guaranteed quality. For example, a first network access node that requires synchronization (e.g., not able to detect any synchronization signal or trigger signaling to the cell for which a suitable synchronization signal was identified) would initiate a procedure towards another network node that enables over the air synchronization to the first network access node.

According to some embodiments, a method, in a network node, for arranging a synchronization service for a target network access node includes receiving a service request from the target network access node for a synchronization service to be provided to the target network access node, selecting a synchronization source node, responsive to the service request, and sending a response towards the target network access node regarding the synchronization service to be provided by the synchronization source node.

According to some embodiments, a method, in a network access node in a wireless communication network, for synchronizing communications in the wireless communication network includes requesting, via a service request, a synchronization service from a network node, receiving synchronization source information corresponding to the synchronization service and using the synchronization source information to detect and measure signals from a synchronization source node, for synchronization.

According to some embodiments, a method, in a source network access node for providing a synchronization service to a target network access node includes receiving a service request from a network node for a synchronization service to be provided to the target network access node, wherein the service request comprises service information to enable the source network access node to provide the synchronization service to the target network access node and providing synchronization source information towards the network node, using the service information.

According to some embodiments, a network node in a wireless communication network, configured to arrange a synchronization service for a target network access node, includes a processing circuit configured to receive a service request from the target network access node for a synchronization service to be provided to the target network access node. The processing circuit is also configured to select a synchronization source node, responsive to the service request, and send a response towards the target network access node regarding the synchronization service to be provided by the synchronization source node.

According to some embodiments, a network access node configured to synchronize communications in a wireless communication network includes a processing circuit configured to request, via a service request, a synchronization service from a network node and receive synchronization source information corresponding to the synchronization service. The processing circuit is also configured to use the synchronization source information to detect and measure signals from a synchronization source node, for synchronization.

According to some embodiments, a source network access node configured to provide a synchronization service to a target network access node includes a processing circuit configured to receive a service request from a network node for a synchronization service to be provided to the target network access node. The service request includes service information to enable the source network access node to provide the synchronization service to the target network access node. The processing circuit is also configured to provide synchronization source information towards the network node, using the service information.

The methods may also be implemented by apparatuses, network nodes, network access nodes, devices, computer readable medium, computer program products and functional implementations. Of course, the present invention is not limited to the above features and advantages. Those of ordinary skill in the art will recognize additional features and advantages upon reading the following detailed description, and upon viewing the accompanying drawings.

DETAILED DESCRIPTION

It is important that there is some signaling towards a target node so as to enhance the performance of solutions based on Network Listening. However, it is recognized herein that one of the problems involves how to get reliable and accurate timing from a different operator. A more generalized problem is how to get a reliable and accurate synchronization signal when the existing mechanisms for inter node communication supporting over the air synchronization (OTA-S) are not available or when the OTA-S signal, that is expected to be present from other cells, is not available.

Various embodiments address these problems. For example, the embodiments leverage RIBS and dedicated architecture to offer synchronization as a service, also between different operators. The embodiments provide an on-demand synchronization service where synchronization signals are enabled on radio beams (either dedicated or already used for UEs). By means of these basic concepts, further features can be enabled in specific implementations (e.g., neighbor relationships and positioning)

Figure 1:
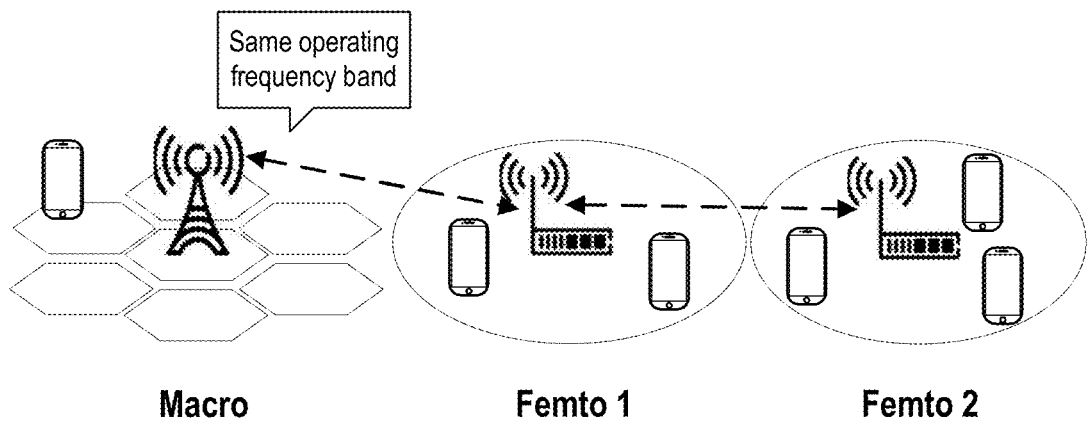
FIG. 1 is a diagram illustrating an over-the-air "network listening" mechanism.
Figure 1:
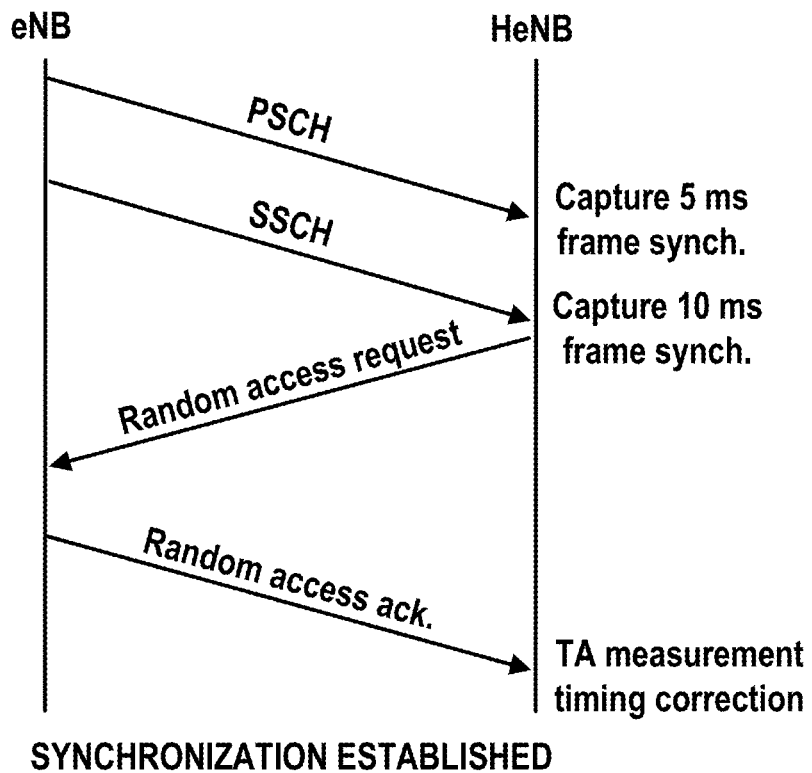
Figure 2:
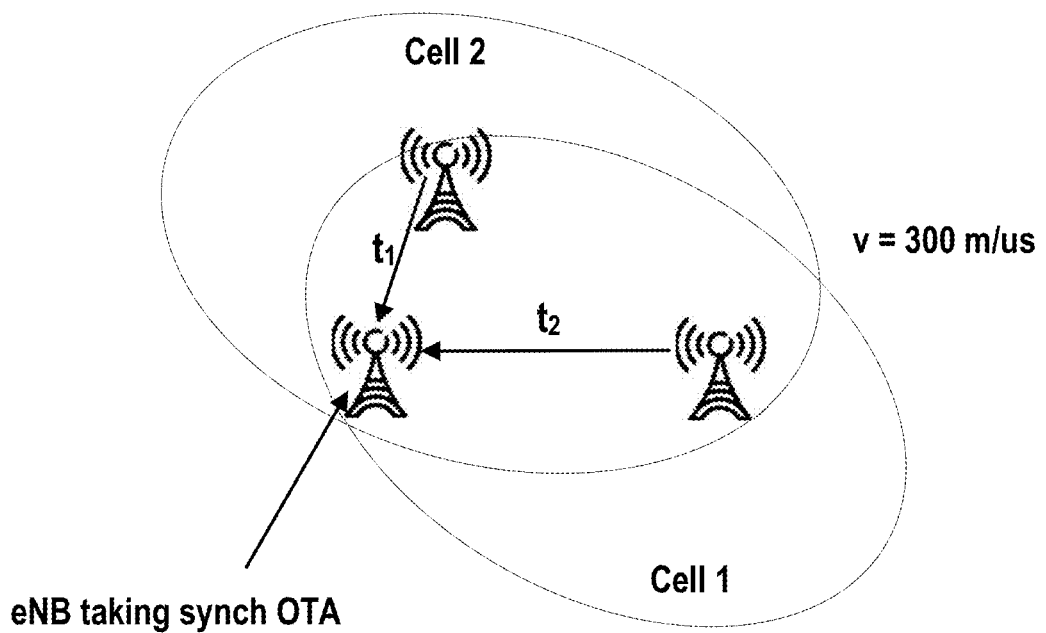
FIG. 2 is a diagram illustrating over-the-air synchronization.
Figure 3:
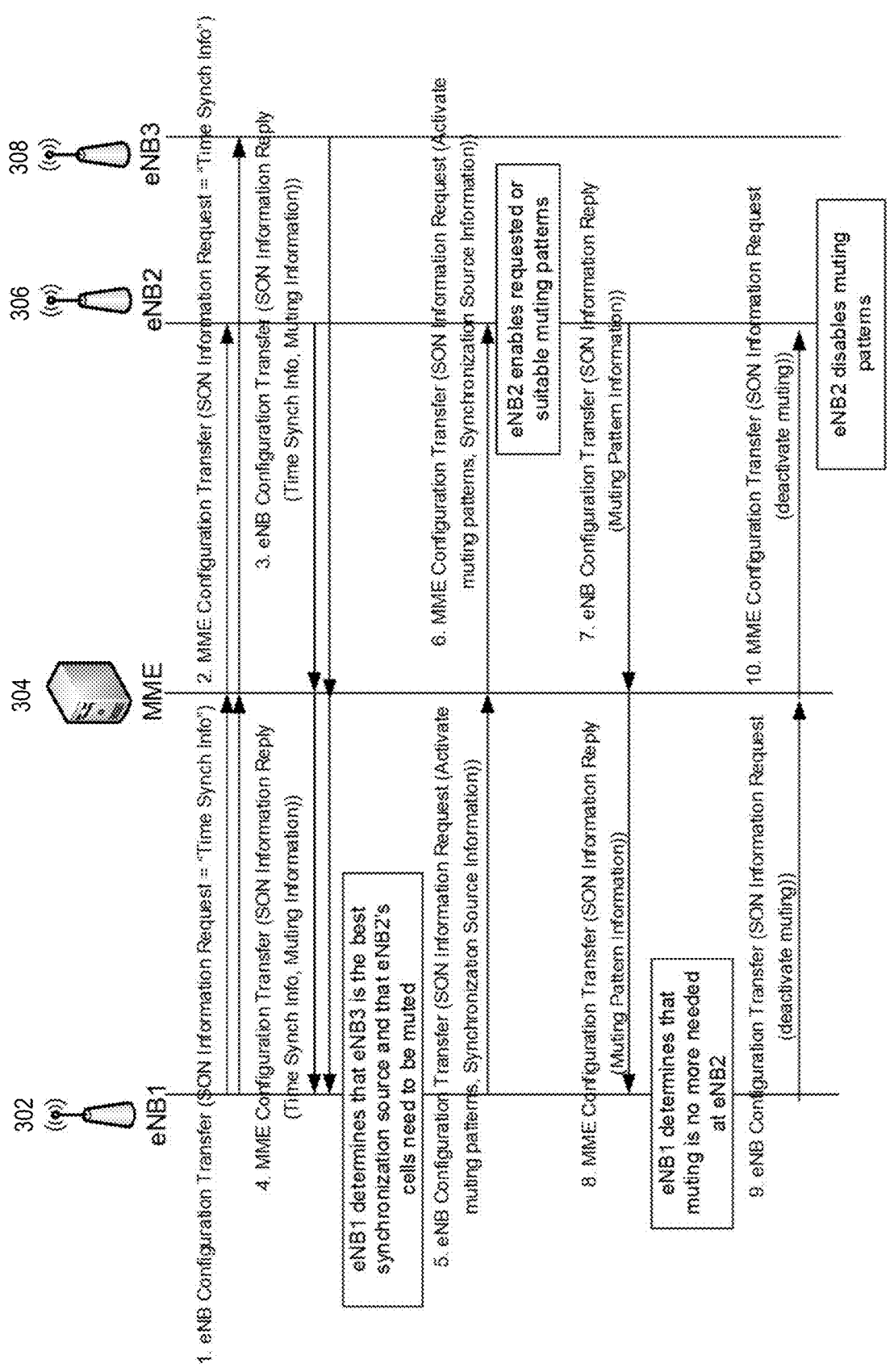
FIG. 3 is a diagram illustrating S1 signaling to support radio interface based synchronization.
Figure 4:
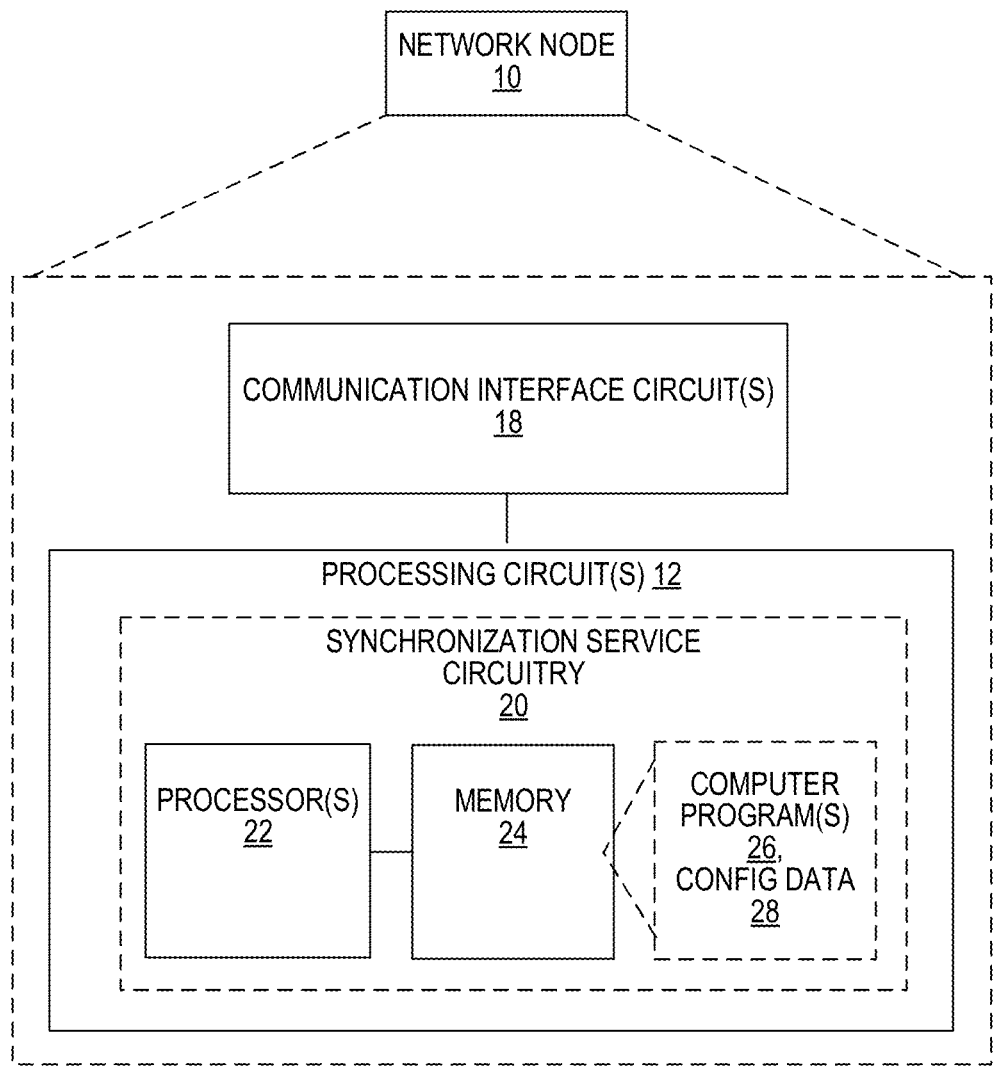
FIG. 4 illustrates a block diagram of a network node, according to some embodiments.

The embodiments described herein involve providing synchronization as a service. In an example, FIG. 4 illustrates a diagram of a network node 10, according to some embodiments. The network node 10 resides in the core network or radio access network and facilitates communication between access networks, the Internet and/or radio access nodes using communication interface circuit 18. The communication interface circuit 18 includes circuitry for communicating with other nodes in the core network, radio nodes, and/or other types of nodes in the network for the purposes of providing data and cellular communication services. According to various embodiments, cellular communication services may be operated according to any one or more of the 3GPP cellular standards, GSM, GPRS, WCDMA, HSDPA, LTE and LTE-Advanced.

The network node 10 also includes one or more processing circuits 12 that are operatively associated with the communication interface circuit 18. For ease of discussion, the one or more processing circuits 12 are referred to hereafter as "the processing circuit 12". The processing circuit 12 comprises one or more digital processors 22, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 12 may comprise fixed circuitry, or programmable circuitry that is specially configured via the execution of program instructions implementing the functionality taught herein, or may comprise some mix of fixed and programmed circuitry. The processor 22 may be multi-core having two or more processor cores utilized for enhanced performance, reduced power consumption, and more efficient simultaneous processing of multiple tasks.

The processing circuit 12 also includes a memory 24. The memory 24, in some embodiments, stores one or more computer programs 26 and, optionally, configuration data 28. The memory 24 provides non-transitory storage for the computer program 26 and it may comprise one or more types of computer-readable media, such as disk storage, solid-state memory storage, or any mix thereof. By way of non-limiting example, the memory 24 comprises any one or more of SRAM, DRAM, EEPROM, and FLASH memory, which may be in the processing circuit 12 and/or separate from the processing circuit 12.

In general, the memory 24 comprises one or more types of computer-readable storage media providing non-transitory storage of the computer program 26 and any configuration data 28 used by the network node 10. Here, "non-transitory" means permanent, semi-permanent, or at least temporarily persistent storage and encompasses both long-term storage in non-volatile memory and storage in working memory, e.g., for program execution.

The processor 22 of the processing circuit 12 may execute a computer program 26 stored in the memory 24 that configures the processor 22 to arrange a synchronization service for a target network access node. The processing circuit 12 is configured to receive a service request from the target network access node for a synchronization service to be provided to the target network access node, select a synchronization source node, responsive to the service request, and send a response towards the target network access node regarding the synchronization service to be provided by the synchronization source node. This structure and functionality may be performed by synchronization service circuitry 20 in the processing circuit 12.

Figure 5:
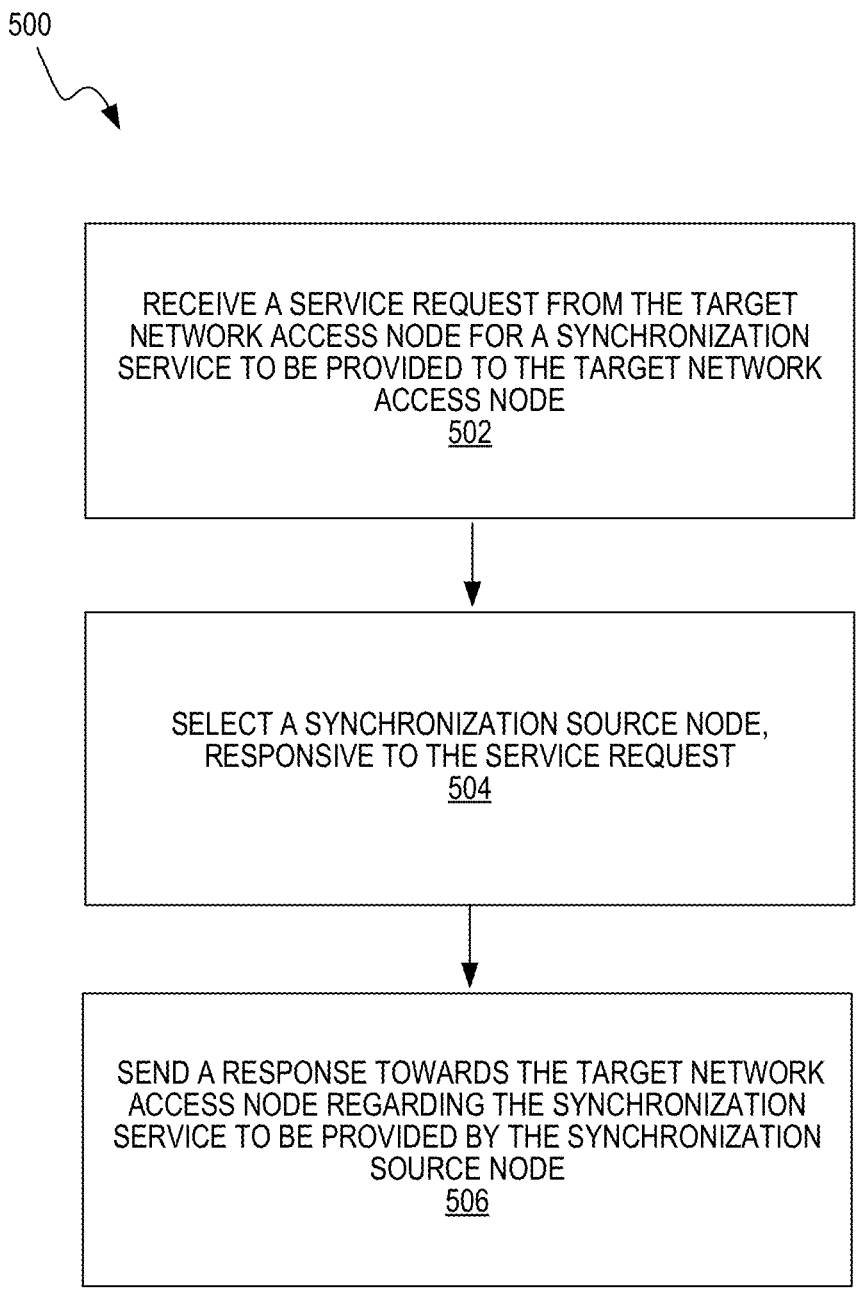
FIG. 5 illustrates a method in a network node, according to some embodiments.

The processing circuit 12 is configured to perform a method for arranging a synchronization service for a target network access node. The method 500 is illustrated by FIG. 5 and includes receiving a service request from the target network access node for a synchronization service to be provided to the target network access node (block 502), selecting a synchronization source node, responsive to the service request (block 504), and sending a response towards the target network access node regarding the synchronization service to be provided by the synchronization source node (block 506). The receiving and sending operations may be performed in coordination with the communication interface circuit 18.

The service request may include service information related to the target network access node's synchronization needs, and the selecting of the synchronization source node is based on the service information. Service information may include information for at least one of: an identifier of the target network node; a location of a transmission point of the target cell for which the request is initiated; a required accuracy; potential muting pattern options; supported frequency bands; a required synchronization update periodicity; desired number of backup synchronization sources; and a level of current synchronization or synchronization stratum level.

In some embodiments, selecting the synchronization source node includes receiving service information from a plurality of candidate synchronization source nodes and selecting the synchronization source node from among the plurality of candidate synchronization source nodes based on the received service information. The service information for each candidate synchronization source node may include identification information for a main synchronization source and alternative synchronization sources. The selecting may then include selecting the synchronization source node from among the plurality of candidate synchronization source nodes based on the respective identification information for each of the plurality of synchronization source nodes.

In other embodiments, the service information for each candidate synchronization source node includes an estimated accuracy of the respective synchronization signal. The selecting then includes selecting the synchronization source node from among the plurality of candidate synchronization source nodes based on the estimated accuracy of the respective synchronization signal for each of the plurality of candidate synchronization source nodes.

In some embodiments, the service information for each candidate synchronization source node includes compensation information to compensate for propagation delays in the respective synchronization signal. The selecting then includes selecting the synchronization source node from among the plurality of candidate synchronization source nodes based on the respective compensation information for each of the plurality of candidate synchronization source nodes.

The service information for each candidate synchronization source node may include information for main synchronization sources or information for a list of alternative or backup synchronization sources available to the candidate synchronization source node. The service information may include beam identifiers for beams supported by the candidate synchronization source node. The service information may also include a stratum level or an estimated accuracy towards synchronization sources based on target node reporting, propagation delay estimates and/or synchronization source properties. The service information may include synchronization reference signal information, including a PRS, an applicable synchronization reference signal, a periodicity, a pattern, a muting, consecutive PRS subframes and/or bandwidth (BW). The service information may also include offset estimates for propagation delay offset compensation or an error estimate with respect to a geolocation of the target network access node and/or the candidate synchronization source node. The service information may include any combination of these pieces of information.

Selection of the synchronization source node may include negotiating with the synchronization source node to establish the synchronization service to be used for the target network access node.

The method 500 may also include deciding whether or not to activate a number of beam reference signals at the synchronization source node and initiating activation of the number of beam reference signals based on the deciding.

The method 500 may also include receiving beam quality information and deciding a beam to be used by the synchronization source node based on the beam quality information.

In some embodiments, the synchronization service includes a synchronization signal made available by a base station of a macro cell, set up of reference signals within dedicated beams and/or use of reference signals within a beam for signaling to served wireless devices in an area of the target network access node.

The method 500 may also include providing to the target network access node a location of a source cell of the selected synchronization source node and/or a frequency band.

Figure 6:
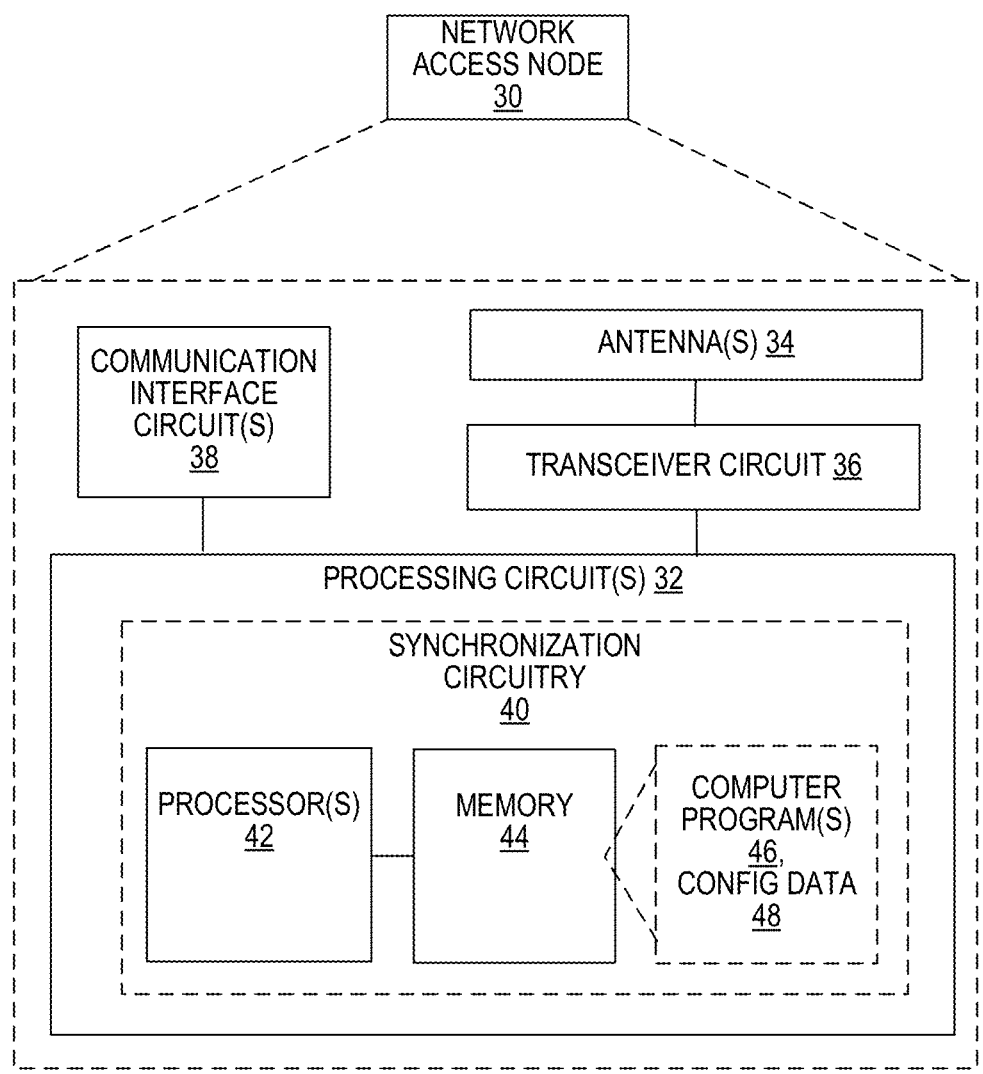
FIG. 6 illustrates a block diagram of a target network access node or synchronization source node, according to some embodiments.

FIG. 6 illustrates a diagram of a network access node 30, according to some embodiments, which can be either a target network access node or a synchronization source node (e.g., source network access node). The network access node 30 provides an air interface to wireless devices, e.g., an LTE air interface for downlink transmission and uplink reception, which is implemented via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE and LTE-Advanced. The network access node 30 may also include a communication interface circuit 38 for communicating with nodes in the core network such as the network node 10, other peer radio nodes, and/or other types of nodes in the network. The network access node 30 may be, for example, a base station or an eNodeB.

The network access node 30 also includes one or more processing circuits 32 that are operatively associated with the communication interface circuit 38 and/or the transceiver circuit 36. The processing circuit 32 comprises one or more digital processors 42, e.g., one or more microprocessors, microcontrollers, DSPs, FPGAs, CPLDs, ASICs, or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 32 may be multi-core.

The processor 42 of the processing circuit 32 may execute a computer program 46 stored in the memory 44 that configures the processor 42 to act as a target access network node. The memory 44, in some embodiments, optionally stores configuration data 48. The processor 42 is configured to synchronize communications in a wireless communication network. The processing circuit 32 is configured to request, via a service request, a synchronization service from a network node, receive synchronization source information corresponding to the synchronization service and use the synchronization source information to detect and measure signals from a synchronization source node, for synchronization. This structure and functionality may be referred to as synchronization circuitry 40 in the processing circuit 32.

In other embodiments, the processor 42 of the processing circuit 32 may execute a computer program 46 stored in the memory 44 that configures the processor 42 to act as a synchronization source node. As such, the processing circuit 32 is configure to provide a synchronization service to a target network access node. The processing circuit 32 is configured to receive a service request from a network node for a synchronization service to be provided to the target network access node, where the service request comprises service information to enable the source network access node to provide the synchronization service to the target network access node. The processing circuit 32 is also configured to provide synchronization source information towards the network node, using the service information. This structure and functionality may also be performed by synchronization circuitry 40 in the processing circuit 32. Sending and receiving operations may be performed in coordination with the communication interface circuit 38 and/or the transceiver circuit 36.

Figure 7:
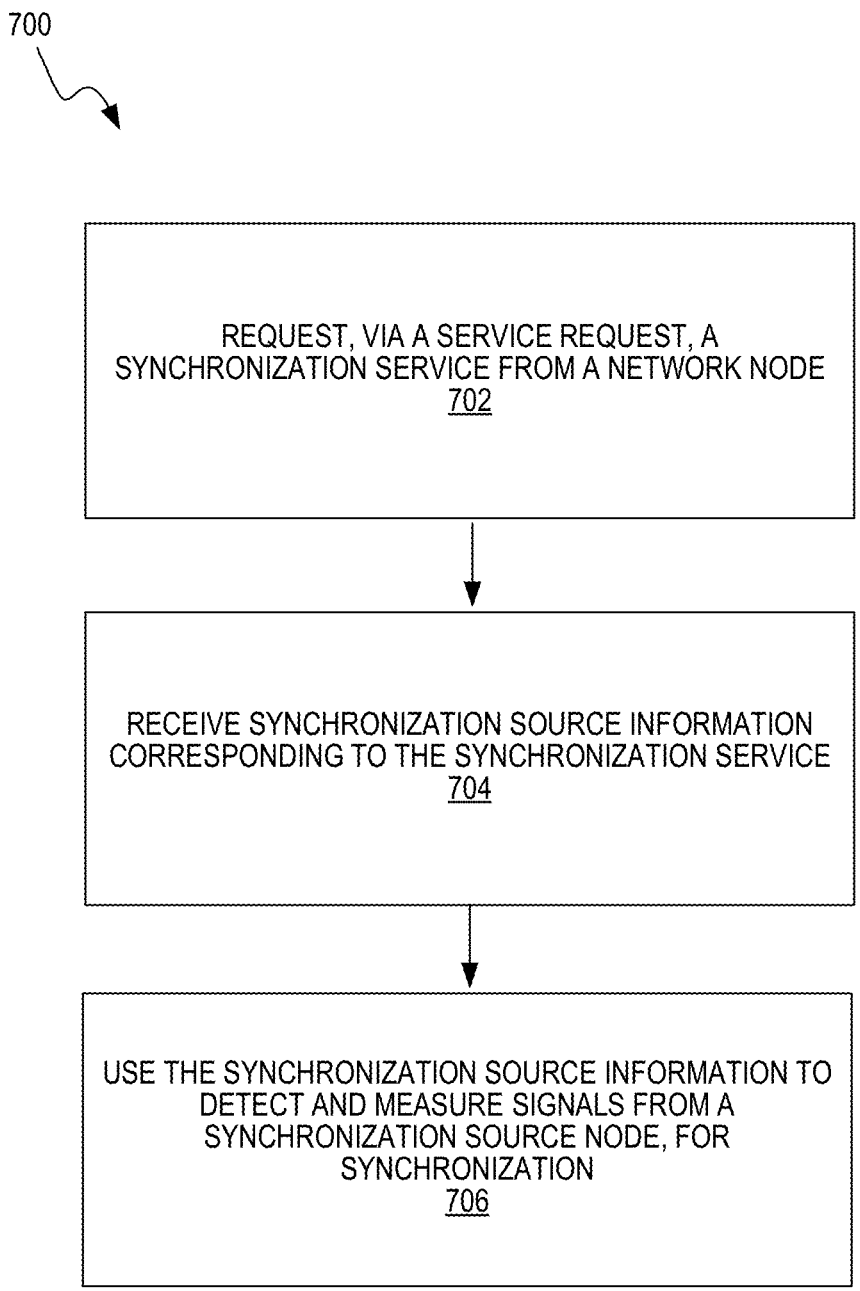
FIG. 7 illustrates a method in a target network access node, according to some embodiments.

In some embodiments, the processing circuit 32 is configured to perform a method for synchronizing communications in a wireless communication network. For example, FIG. 7 illustrates a method 700 that includes requesting, via a service request, a synchronization service from a network node (block 702), receiving synchronization source information corresponding to the synchronization service (block 704) and using the synchronization source information to detect and measure signals from a synchronization source node, for synchronization (block 706).

The service request may include service information related to the target network access node's synchronization needs, said service information including a location of a transmission point of the target cell for which the request is initiated; a required accuracy; potential muting pattern options; supported frequency bands; a required synchronization update periodicity; desired number of backup synchronization sources; and/or a level of current synchronization or synchronization stratum level.

The synchronization source information may include a location of a source cell of the selected synchronization source node and/or a frequency band. The synchronization source information may also include: compensation information to compensate for propagation delays; information for main synchronization sources; and/or information for a list of alternative or backup synchronization sources available to the synchronization source node. The synchronization source information may also include beam identifiers for beams supported by the synchronization source node; beam quality information; a stratum level; a synchronization signal made available by a base station of a macro cell; and/or an estimated accuracy towards synchronization sources based on target node reporting, propagation delay estimates; and/or synchronization source properties. The synchronization source information may also include synchronization reference signal information, including a PRS, an applicable synchronization reference signal, a periodicity, a pattern, a muting, consecutive PRS subframes, a BW; offset estimates for propagation delay offset compensation; and/or an error estimate with respect to a geolocation of the target network access node and/or the synchronization source node.

The method 700 may include reporting information about a quality of the synchronization service, subsequent to said synchronizing.

In some embodiments, the method 700 includes instructing served user equipments to measure channels of detected beams and to report such measurements, and selecting a beam of the detected beams for synchronization based on the measurements. This may include reporting the selected beam to the network node. Information about a beam quality associated with the synchronization service may also be reported.

Figure 8:
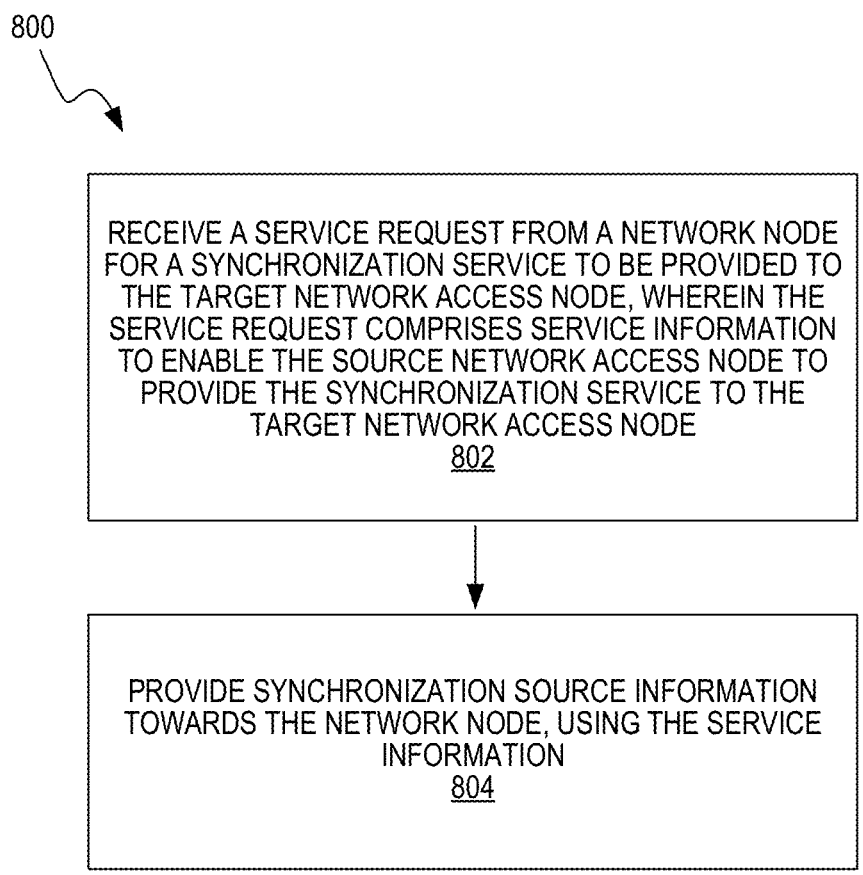
FIG. 8 illustrates a method in a synchronization source node, according to some embodiments.

In some embodiments, the processing circuit 32 is configured to perform a method for providing a synchronization service to a target network access node. For example, FIG. 8 illustrates a method 800 that includes receiving a service request from a network node for a synchronization service to be provided to the target network access node, where the service request comprises service information to enable the source network access node to provide the synchronization service to the target network access node (block 802) and providing synchronization source information towards the network node, using the service information (block 804).

The method 800 may include negotiating with the network node to determine the synchronization service to be used by the source network access node to provide synchronization source information to the target network access node.

In some embodiments, the service information includes: a location of a transmission point of the target cell for which the request is initiated; a required accuracy; potential muting pattern options; supported frequency bands; a required synchronization update periodicity; desired number of backup synchronization sources; and/or a level of current synchronization or synchronization stratum level.

The synchronization source information may include a location of a source cell of the selected synchronization source node and/or a frequency band. The synchronization source information may also include: compensation information to compensate for propagation delays; information for main synchronization sources; information for a list of alternative or backup synchronization sources available to the synchronization source node; beam identifiers for beams supported by the synchronization source node; beam quality information; stratum level; and/or a synchronization signal made available by a base station of a macro cell. The synchronization source information may also include an estimated accuracy towards synchronization sources based on target node reporting, propagation delay estimates; and/or synchronization source properties. The synchronization source information may include synchronization reference signal information, including a PRS, an applicable synchronization reference signal, a periodicity, a pattern, a muting, consecutive PRS subframes, and/or a BW. The synchronization source information may include offset estimates for propagation delay offset compensation; and an error estimate with respect to a geolocation of the target network access node and/or the synchronization source node.

In some embodiments, the method 800 also includes activating a number of beam reference signals at the source network access node to be detected by the target network access node, receiving beam signal detection reports from the target network access node, and deactivating reference signals in beams for which signals have not been detected.

Figure 9:
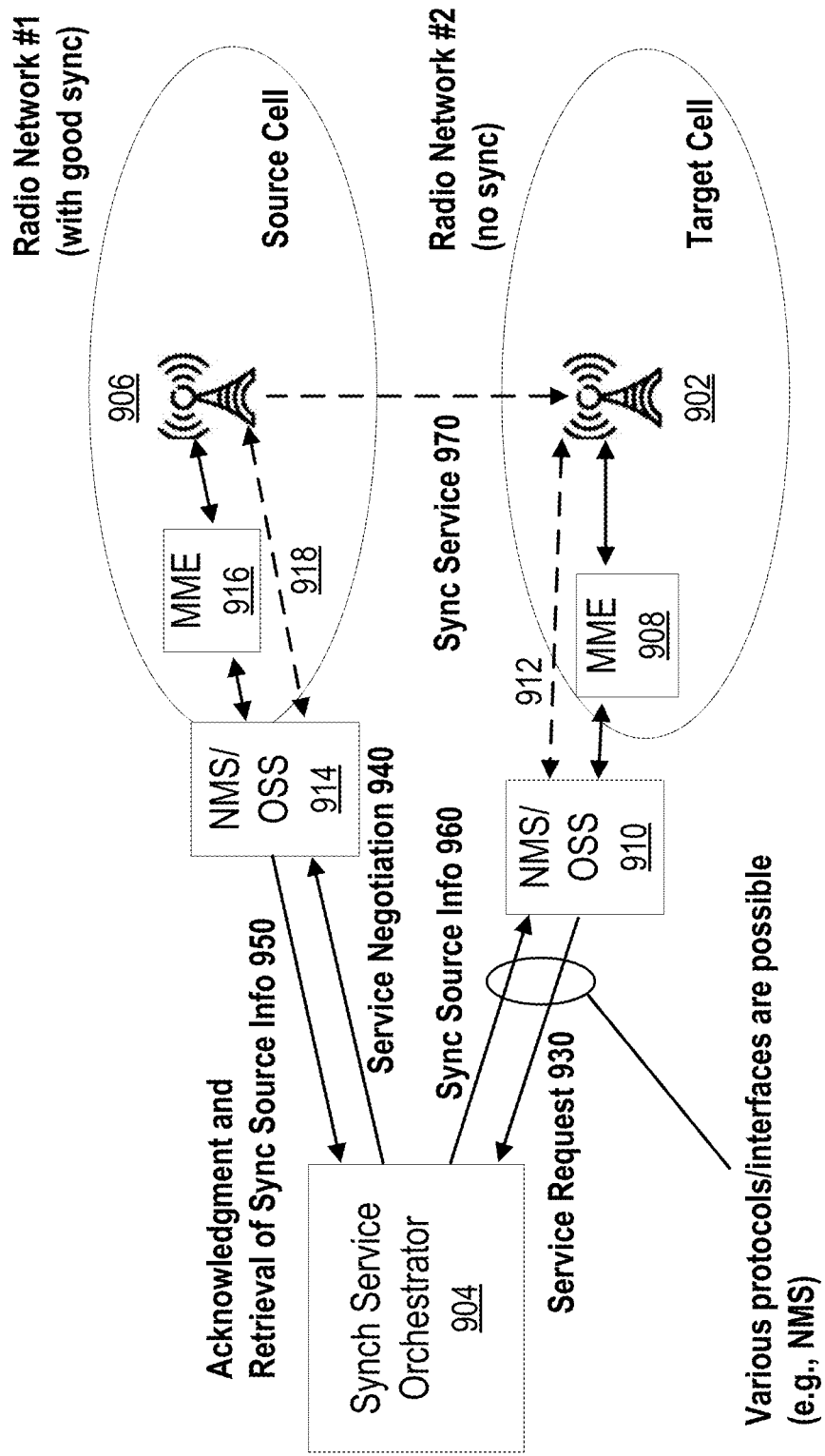
FIG. 9 is a diagram illustrating provision of a synchronization service, according to some embodiments.

FIG. 9 illustrates another example implementation, where a radio access node 902 of Radio Network #2 requires synchronization, but it is not able to detect any synchronization signal or trigger signaling to the cell for which a suitable synchronization signal was identified. The radio access node 902 may be a cell served by a dedicated operator that does not serve other overlapping cells. The cell has no GNSS visibility or connection to a PTP capable network, but needs some source of accurate and reliable synchronization.

The radio access node 902 initiates a procedure towards a network node that orchestrates or provides the function of enabling over the air synchronization to the radio access node 902. The radio access node 902 may be referred to as the synchronization target node 902. The procedure initiated by the target node 902 may include a request ("Service Request") to the centralized entity or orchestrator node 904 (indicated as a Synchronization Service Orchestrator 904 in FIG. 9), as part of Step 930. The request may be via its own Mobility Management Entity (MME) 908 and Network Management System/Operations Support System (NMS/OSS) 910, or via the NMS/OSS 910 through a more direction connection 912.

The request includes all relevant information to enable the orchestrator node 904 to enable a synchronization service. This information may include the location of the transmission point of the target cells for which the request is initiated, the required accuracy, potential muting pattern options, a level of current synchronization also known as synchronization stratum level, etc. According to another example, the request could be directly sent from the target node 902 to the orchestrator node 904.

The information in the request may include a position of the target node's 902 own transmission points and an estimated inaccuracy, if known, for area information and potential propagation delay estimates. If the estimated inaccuracy is known, the target node 902 may provide a list of neighbor nodes with which it would like to achieve good phase synchronization accuracy. This information would allow the orchestrator node 904 to steer the neighbor nodes to use the same synchronization source to eliminate common errors. This assumes some scanning operation by the target node 902. Note that in cases of Beam Forming, the target node 902 may not be able to provide an accurate indication due to the lack of signals to be measured in a neighbor node. The action from the orchestrator node 904 could then be based on position information of the target node 902. For example, the orchestrator node 904 may identify neighboring nodes in need of a common synchronization source from the geolocation information provided by the target node 902. A combined solution with exchanged information between target node 902 and orchestrator node 904 would provide a more accurate solution.

Other information in the request may include supported frequency bands for the RIBS downlink (DL) receiver; a required accuracy, and a required synchronization update periodicity. This may often include a function of several target node-specific details like temperature drift rate, oscillator used, redundancy for missed synchronization occasions, and switchover time to a backup node. Note that a higher periodicity could increase the overhead for the source node (e.g., existing PRS periodicity configurable). Other information may include if and how many backup nodes are desired.

Once messages related to Step 930 are triggered, the orchestrator node 904 triggers a second negotiation step (Step 940), with related messages towards one or more potential synchronization source nodes, in order to initiate the negotiation for the synchronization service.

The related messages may be directly addressed to synchronization source nodes, such as source node 906, or pass through a NMS/OSS 914, where they then pass through either the MME 916 associated with Radio Network #1 or a more direct connection 918. The related messages result from the orchestrator node's 904 analysis of the information provided by the target node 902. The analysis may determine which opportune synchronization source node was identified. The orchestrator node 904 negotiates either directly with a source node 906 or via the NMS/OSS 914 and/or the MME 916, in order to identify a visible network that can cover the area of Radio Network #2 with suitable muting patterns, etc.

In Step 950, the time synchronization information, also referred to as the synchronization source information, is provided by potential synchronization sources. Information received during Step 950 from a potential synchronization source node 906 may include an ID, basic information for a main synchronization source and a list of synchronization backup alternatives (namely a list of synchronization sources available to the source node 906, listed in order of priority). Beam IDs may be included if needed (for the source node 906), namely identifiers for the beams supported by the source node 906 in which synchronization signals may be transmitted. Note that backup alternatives could activate synchronization signals only during pre-defined measurements periods with far less periodicity than a main alternative.

The information may also include a stratum level for synchronization sources, an estimated accuracy towards synchronization sources based on, for example, target node reporting, propagation delay estimates and synchronization source properties. The information may include synchronization reference signal details, such as PRS or, more generally, applicable synchronization reference signals (periodicity, pattern, muting, consecutive PRS subframes, and/or bandwidth). The information may include offset estimates for propagation delay offset compensation (line-of-sight (LOS) based for geo-position based) including an error estimate. This could be based on a knowledge of geolocation of the target node 902 (and source node 906).

The source node 906 may send this information directly to the orchestrator node 904 or it may send this information to its own MME 906, which in turn sends it to the orchestrator node 904 via the NMS/OSS 914. Note that more than one node may have been contacted by the orchestrator node 904 during Step 940 of FIG. 9. This may be to collect information from several nodes and select the best synchronization source node amongst a range of nodes.

The orchestrator node 904 analyses the information from the target node 902 and information from the source node 906, and coordinates the configuration of target and source nodes 902 and 906 (as well as target neighboring cells) to achieve RIBS synchronization.

In particular, the orchestrator node 904 decides which is the best synchronization source based on the information received from source and target nodes 902 and 906, i.e., the orchestrator node 904 makes a synchronization source node decision after Step 950. The decision is communicated during Step 960 to the target node 902.

Depending on the specific deployment, various use cases are possible in terms of the synchronization service that can be enabled by the orchestrator node 904. In one case, a synchronization signal is made available by a base station of a Macro Cell (e.g. 3G/4G). In another case, reference signals are setup within dedicated beams (e.g., for 5G). In another case, reference signals are used within a beam used for signaling to serve UEs (therefore served by the source node 906) in the area of the target node 902.

In Step 960, the information from source node 906/orchestrator node 904 are delivered to the target node 902. All the relevant information (e.g., location of the source cell, frequency band, etc.) on the selection of a synchronization source node may be made available to the target node eNB 902 during Step 960. The relevant information is forwarded from the orchestrator node 904 to the Radio Network #2 potentially via the MME 908 and via the NMS/OSS 910 for starting the related synchronization service, which is performed at Step 970. Communications can be done via standard protocols with suitable extensions and schemes (e.g., software-defined networking (SDN), NMS).

In some embodiments, a follow up phase is appropriate. After the service initialization, on a regular basis (if needed) the target node 902 can report information about a synchronization quality status (e.g., in terms of signal level) for the selected synchronization source node 906 (and for back up references in case additional candidate references have been identified). This may include, for example, reporting a change of main synchronization source status (e.g., failure conditions).

Note that this reported information allows an option for the target node 902 to fast switch over to a candidate synchronization source, such as source node 906, without potential delay in requesting and processing a new node. A later update can be sent to the orchestrator node 904 concerning this change. The actual need depends on the acceptable delay in requesting a new node and on properties of a synchronization target clock source, synchronization accuracy, etc.

The reported information may also include a request for muting of specific resources to facilitate the detection of the synchronization signals, a desired change in number of consecutive reference signals subframes, a bandwidth on which reference signal detection is performed, and a periodicity of synchronization reference signals listening events. It is up to the orchestrator node 904 to decide based on the synchronization status versus the desired accuracy, since this is also related to the trade-off between performance and overhead.

The reported information may include a request of initiating a scan of regular synchronization reference signals to evaluate alternative synchronization sources (including, e.g., a beam sweep or detection of reference signals over different propagation patterns).

The reported information may include information about when no synchronization updates are needed and a duration of such off times, such as if a small cell enters sleep mode. The reported information may include newly discovered nodes towards which a strict phase relation is needed.

Moreover, after initialization, perhaps on a regular basis, the orchestrator node 904 could initiate a scan. This initiation could be with a request to the target node 902 to perform measurements and potentially synchronize sources to initiate transmission. As part of this action, the orchestrator node 904 could request a synchronization status report from a synchronization target node. A new synchronization source may be proposed based in this report.

According to some embodiments, the synchronization source can then provide the following information about a degradation in service, if synchronization source alternatives must be changed, or if a synchronization source is in holdover (and if so what frequency accuracy it may have). Holdover is a situation where the node is not able to synchronize its internal clock with a reliable source of synchronization and it runs its clock independently.

Some embodiments may involve direct negotiations of a RIBS synchronization service. An approach using a direct connection between the radio network servers might be possible in some cases (see Sync Request 1010, Sync Source Info 1020 and Sync Service 1030 steps in FIG. 10), when more dynamic reconfiguration is required. This requires specification of a suitable protocol. Note that RIBS allows for an exchange of timing information between eNBs via multiple MMEs. For example, a target node 902 may be connected to an MME that is not connected to the source node 906 (connected to another MME). The source and target nodes 906 and 902 would then exchange S1 timing information via an inter MME interface. In this setup, the MME in Radio Network #1 could take the role of orchestrator.

Some embodiments involve beamforming (BF). BF systems will be advantageous for RIBS by improving link gain between synchronization source-target nodes and creating orthogonality in a space to reduce interference. This will improve the SNR of the received synchronization signals, resulting in improved RIBS synchronization accuracy.

In the context of 5G systems, a lean carrier is a carrier where cell common signals are reduced to a minimum. For this reason, reference signals suitable for over the air synchronization may not always be available.

In some embodiments, the source node 906 and target node 902 are engaged either in a direct node-to-node communication or in communication with an orchestrator node 904. Such communication may involve the exchange of information described in previous embodiments.

Once the synchronization source has been selected for a given synchronization target node, the synchronization source only enables synchronization reference signals in desired beams directions, thereby reducing overall interference and overhead. Such beam directions selection depends on the synchronization target node. For example, some beams may have a more favorable path loss towards the synchronization target node receiver. Alternatively, some beams may have a wide area coverage and be more suitable to guarantee robust reference signal detection.

Therefore, as part of RIBS initialization of synchronization service between a synchronization source and a synchronization target, an optimal beam direction must be identified for each synchronization source candidate.

There could be different approaches for identifying and selecting the optimal beam direction and it also depends on whether fixed or dynamic beams are used. One way to detect the right beam and direction may consist in letting the source node 906 or the orchestrator node 904 receive target node 902 information (as described above) and let the source node 906 or the orchestrator node 904 decide to activate a number of beam reference signals at a source node 906, where some of such signals are likely to be detected by the target node

Figure 11:
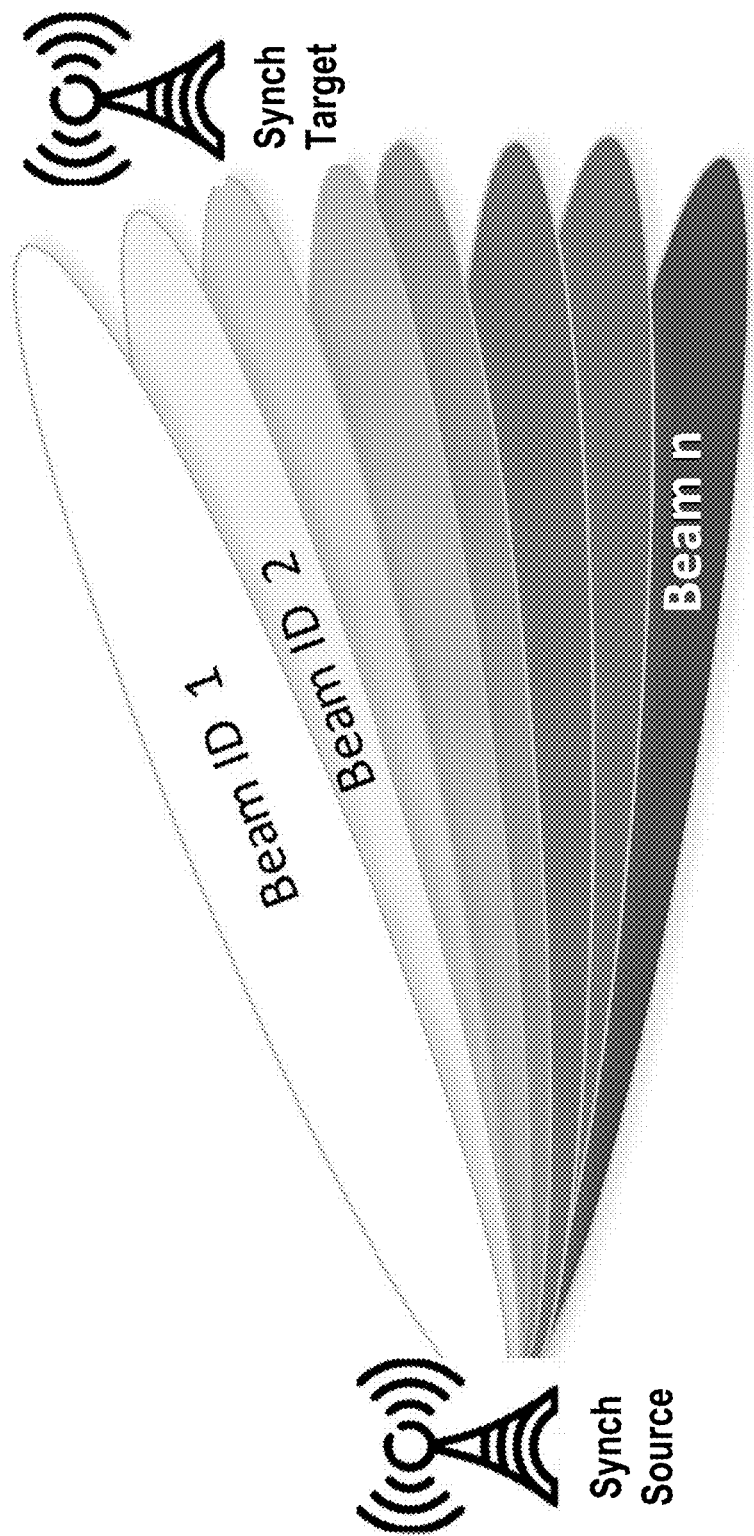
FIG. 11 is a diagram illustrating RIBS beam forming.

902. If the target node 902 is able to detect one or more of such signals, the target node 902 can report back to the source node 906 (either directly or via the orchestrator node 904) the signals and other identifiers detected. The synchronization source 906 can deactivate reference signals in the beams for which signals have not been detected. FIG. 11 illustrates RIBS beam selection.

A variant of the latter method may include the source node activating the beam that is supposed to cover the geolocation of the target node 902, where such a target location is either known via configuration or received signaling or acquired by means of historical UE measurements.

Another way to identify the beam for which reference signals should be detected could be via UE assistance. For example, the target node 902 could instruct its served UEs to measure channels of the beams visible and to report such measurements. Based on such measurements, the target node 902 may select a beam that is most suitable. This may be beneficial in case the target node 902 is not able to hear beams from the source node 906 that are instead intercepted by the connected UEs.

It is worth mentioning that without a proper initialization and information exchange as part of the service, the target node 902 might not only get an unpredictable and varying synchronization quality over time, it might not even discover the presence of a synchronization source.

Figure 12:
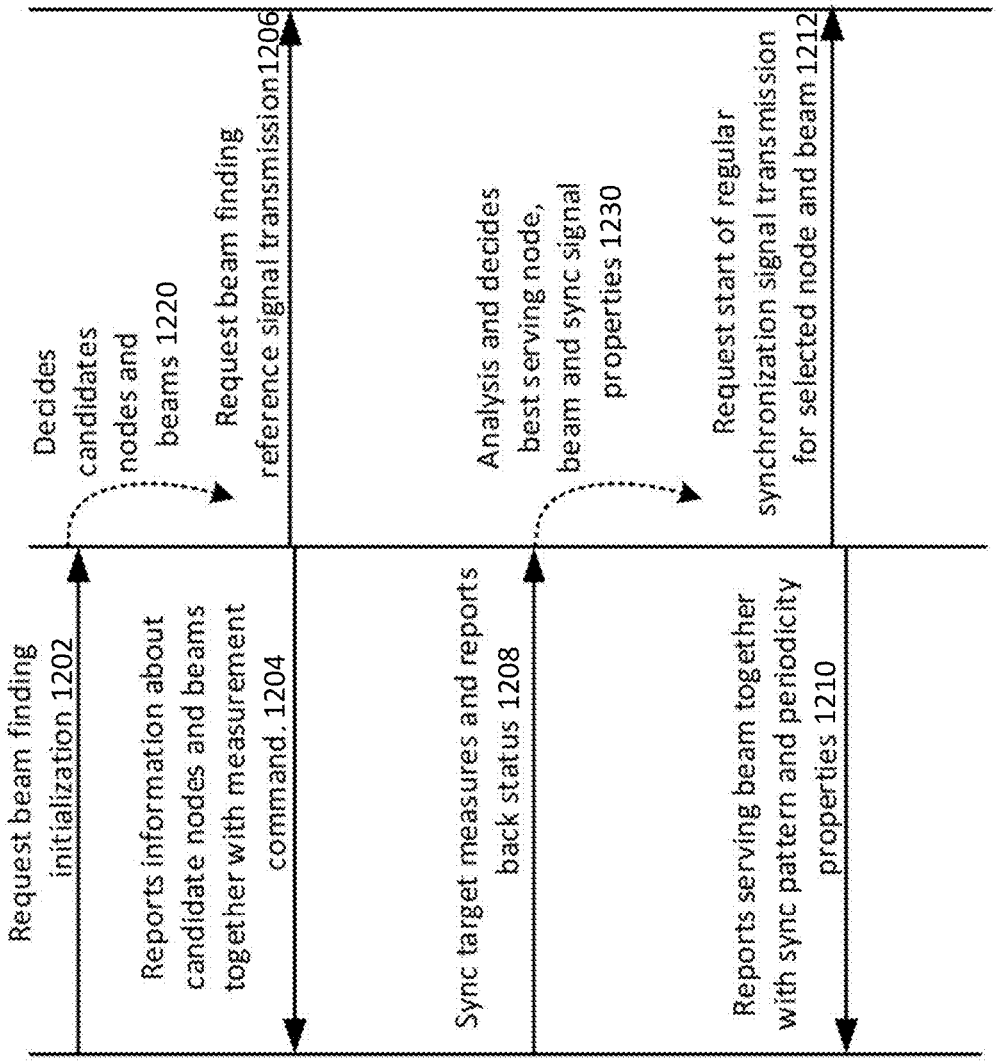
FIG. 12 is an example of a Node-Beam selection procedure.

In one approach, shown in FIG. 12, based on a request (Step 1202) from target node 902, candidate synchronization source(s) activate reference signals in different beams together with an identification for each beam. The target node 902 receives, analyzes and feeds back information about beam quality (Steps 1204, 1208) to the source node 906 or to the orchestrator node 904, which in turn can use this in evaluating a best synchronization source and beam to be used (Steps 1220, 1230). This may involve a request for a beam finding reference signal transmission to the source node 906 (Step 1206). At Step 1210 the orchestrator node 904 reports a serving beam with synchronization pattern and periodicity properties. At Step 1212, the orchestrator node 904 requests the start of regular synchronization signal transmissions for selected the selected node and beam.

During the process of evaluating which beam is best from a plurality of beams and nodes, the measurements collected by the synchronization target node 902 on the signals provided by the source node 906 also reveal information about signals that interfere with the reference signal selected as the best synchronization signal. Such signals could be other reference signals or data channel signals transmitted by neighboring beams or cells.

Hence, in addition to best beam identification, the analysis also provides information about interfering signals in a spatial domain. The orchestrator node 904 (or the source node 906, if communication is directly to the source node 906) can use this information to request muting of specific beams aligned in time with synchronization target reception. The target node 902 can use this information to perform interference rejection through additional signal processing.

The analysis and feedback could also be used to detect differences towards first path of arrival thereby giving an estimate of LOS/NLOS ratios and input to propagation delay compensation algorithms.

In above mentioned approach, beams could be either fixed or dynamically swept (the later sometimes referred as device specific beamforming). In another approach for node and beam selection, reference signals could be sent from the target node 902 and measured by candidate synchronization source nodes. Note that optimal beam direction can, in addition to horizontal alignment, also include vertical alignment.

On a regular basis, a new beam scan can be needed due to changes in a radio environment. Such a scan can be triggered by either the target node 902 due to perceived service degradation or from an orchestrator node 904 based on, for example, knowledge about new deployed nodes that could be used as synchronization sources. An orchestrator node 904 can in addition, based on scan procedures by connected nodes, store a list of candidate nodes/beams to be quickly activated, if for some reason serving beam quality degrades.

Node positions and antenna array directions could also be used to estimate beam direction for LOS. The beamforming also gives the central node yet another option (in space) to optimize muting patterns for best service.

Figure 10:
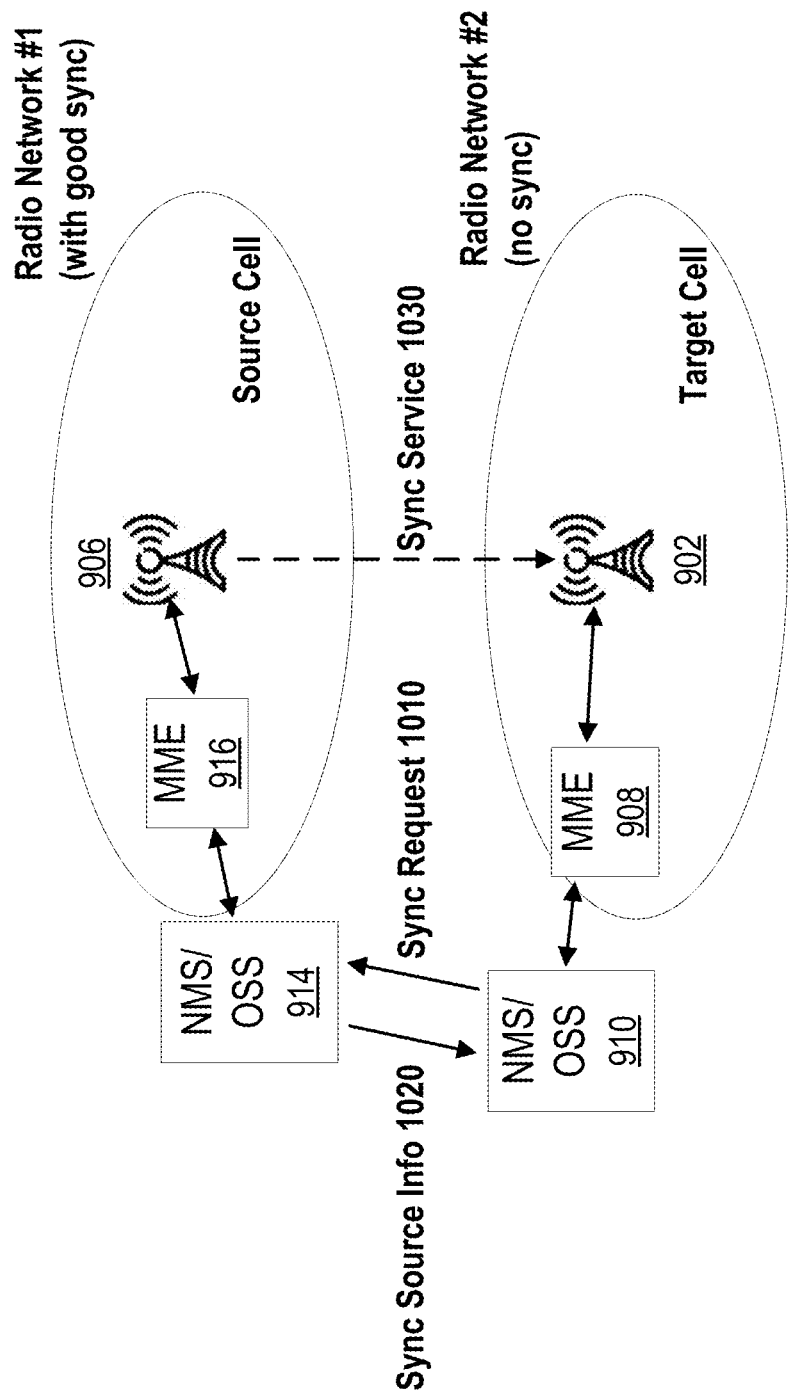
FIG. 10 is a diagram illustrating direct negotiations of RIBS sync service, according to some embodiments.

In another example of the embodiment, the source node 906 and target node 902 may be directly connected via an interface or be connected via an interface passing through a middle node, such as shown in FIG. 10.

Figure 13:
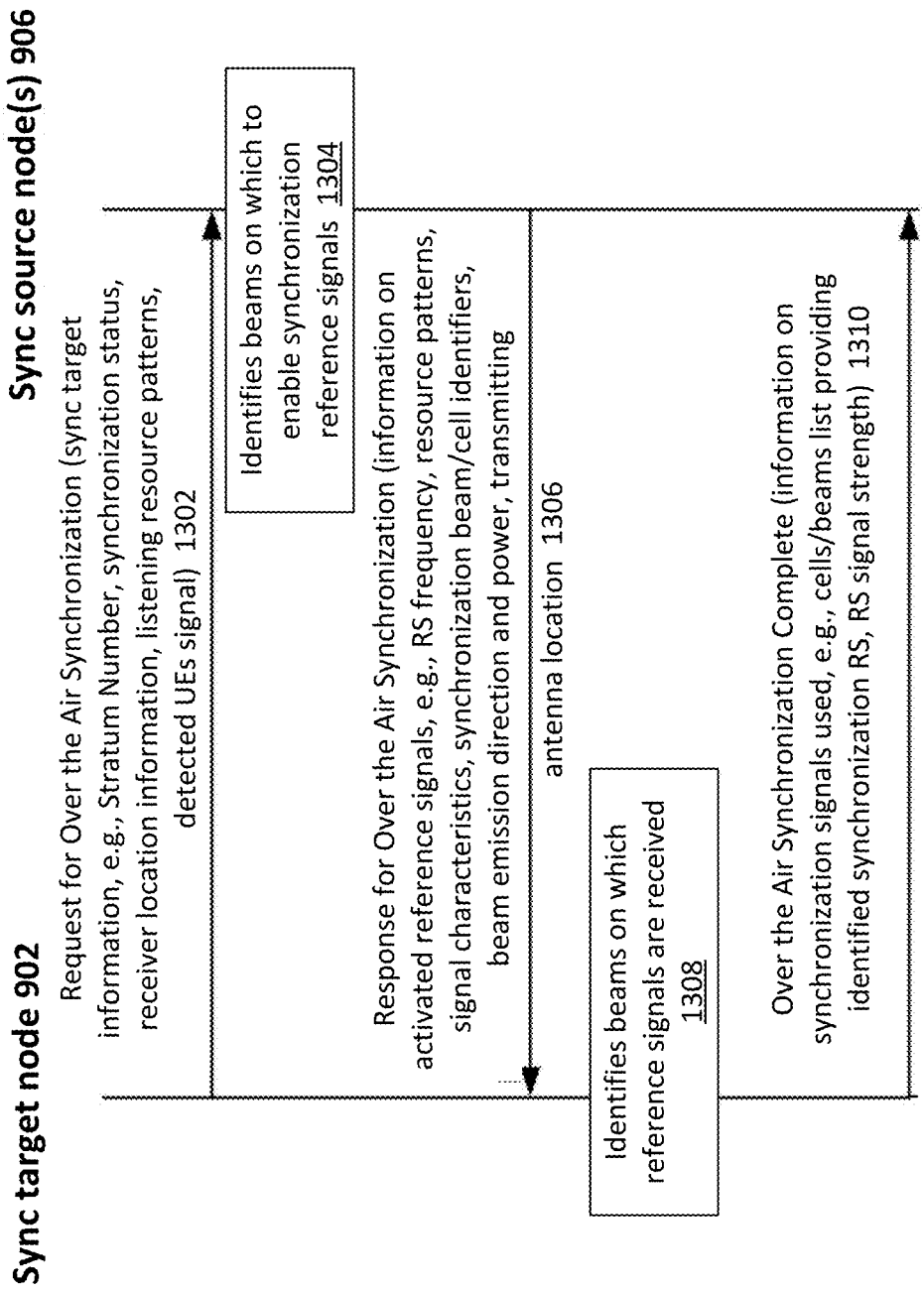
FIG. 13 is another example of a Node-Beam selection procedure.

The example in FIG. 13 shows a case where two synchronization source nodes 906 and a target node 902 are connected via a direct interface. Note that in the case of multi-operators, it is implied that a direct connection is set up. This interface could be the X2 interface, an enhanced version of the X2 interface or any interface connecting two network access nodes. An analogous example could be via an indirect interface such as the S1 interface or any alternative.

In this example, the synchronization target node 902 requests a synchronization source node 906 for over the air synchronization services (Step 1310). The target node 902 can include information such as the Stratum Number (a representation of how many over the air synchronization hops the target is from a reliable synchronization source), synchronization status (synchronous/asynchronous), location information for the receiver, resources in which the synchronization reference signal (RS) can be detected, and/or eventual signals from UEs served by the source eNB. This information may be detected by the target node 902 that may, in this way, get some indirect information about the source node 906.

The source node 906, on the basis of the information received, identifies (Step 1304) and enables synchronization RSs on some of its served cells/beams. The source node 906 signals back to the target node 902 a number of information items such as frequencies on which the RS is emitted, a pattern of resources on which the RS is emitted, cell/beam identifiers on which the RS is emitted, transmitter location information, beam direction and/or emission power (Step 1306). The target node 902 attempts to identify some or all of the enabled RSs (Step 1308) and signals back to the source node 906 details about the RS signals that have been detected (Step 1310). The latter allows the source node 906 to disable any RS signals that are not needed, therefore improving power consumption.

Note that although terminology from 3GPP LTE has been used in this disclosure to describe embodiments of the invention, this should not be seen as limiting the scope of the invention to only the aforementioned system. Other wireless systems, including WCDMA, WiMax, UMB and GSM, may also benefit from exploiting the ideas covered within this disclosure.

Various embodiments described herein also provide for the following advantages. They allow any device with visibility of a radio signal to get accurate and reliable synchronization. They provide a solution that is particularly useful when delivering synchronization between different operators (but not limited to that). It reuses some aspects of the technologies being standardized by 3GPP (RIBS). It also can be based on concepts that are expected to become the foundation of future networks (e.g., SDN). It allows a node that requires synchronization to request that synchronization signals are enabled on demand in a way that the service "over the air synchronization" can be provided.

Potential additional use cases can be addressed: IoT connected via "non-conventional 5G/4G/3G/2G" networks (e.g., Wi-Fi), but that can still receive synchronization services from the traditional mobile xG network. The Wi-Fi hotspot itself could receive a synchronization reference. By means of the basic concepts, further features can be enabled in specific implementations (e.g. neighbor relationships and positioning).

Figure 14:
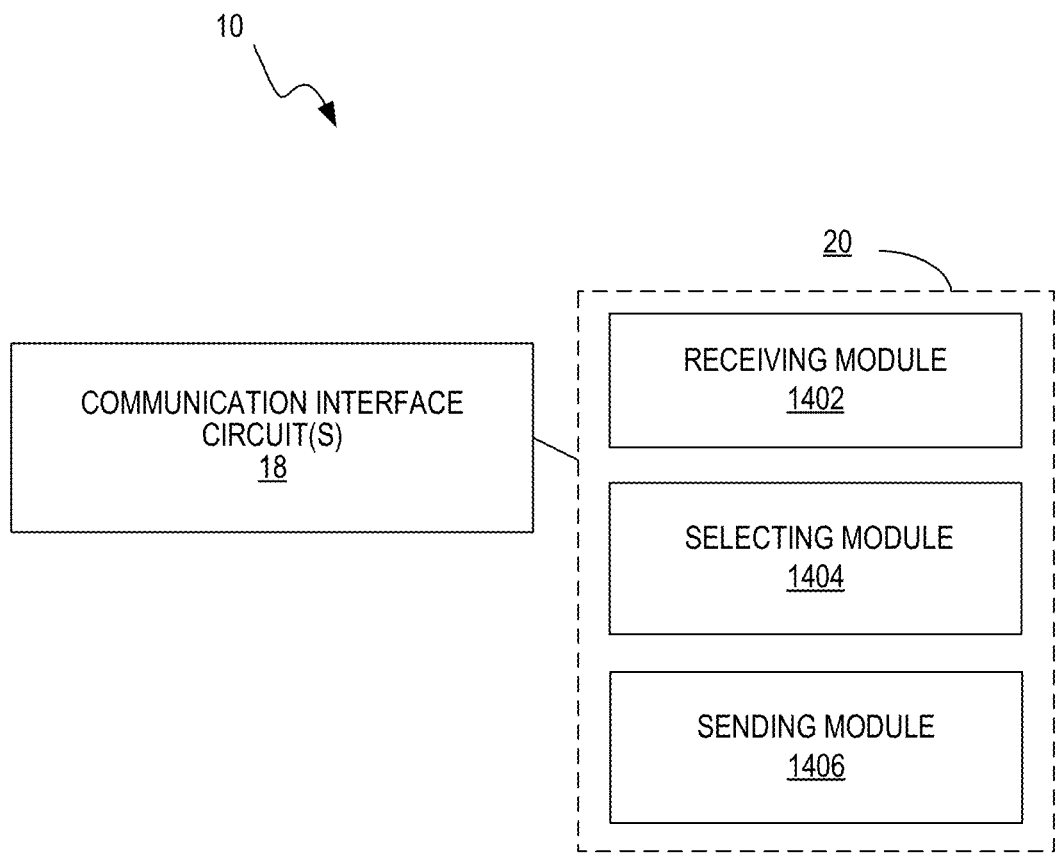
FIG. 14 illustrates a functional implementation of a network node, according to some embodiments.

FIG. 14 illustrates an example functional module or circuit architecture as may be implemented in the network node 10, e.g., based on the synchronization service circuitry 20. The illustrated embodiment at least functionally includes a receiving module 1402 for receiving a service request from a target network access node for a synchronization service to be provided to the target network access node, a selecting module 1404 for selecting the synchronization source node, responsive to the service request, and a sending module 1406 for sending a response towards the target network access node regarding the synchronization service to be provided by the synchronization source node.

Figure 15:
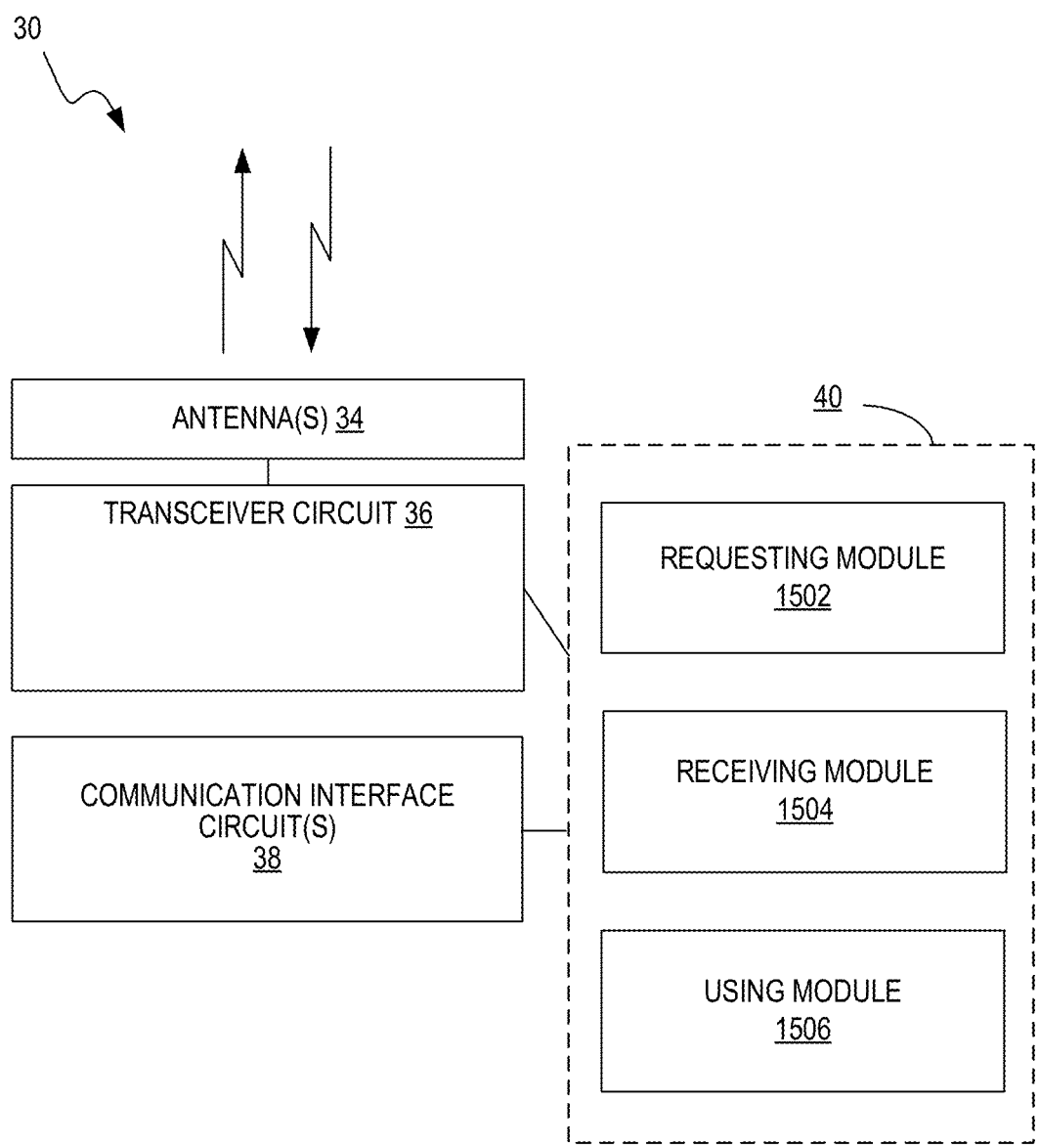
FIG. 15 illustrates a functional implementation of a target network access node, according to some embodiments.

FIG. 15 illustrates an example functional module or circuit architecture as may be implemented in a target access network node 30, e.g., based on the synchronization circuitry 40. The illustrated embodiment at least functionally includes a requesting module 1502 for requesting, via a service request, a synchronization service from a network node, a receiving module 1504 for receiving synchronization source information corresponding to the synchronization service and a using module 1506 for using the synchronization source information to detect and measure signals from a synchronization source node, for synchronization.

Figure 16:
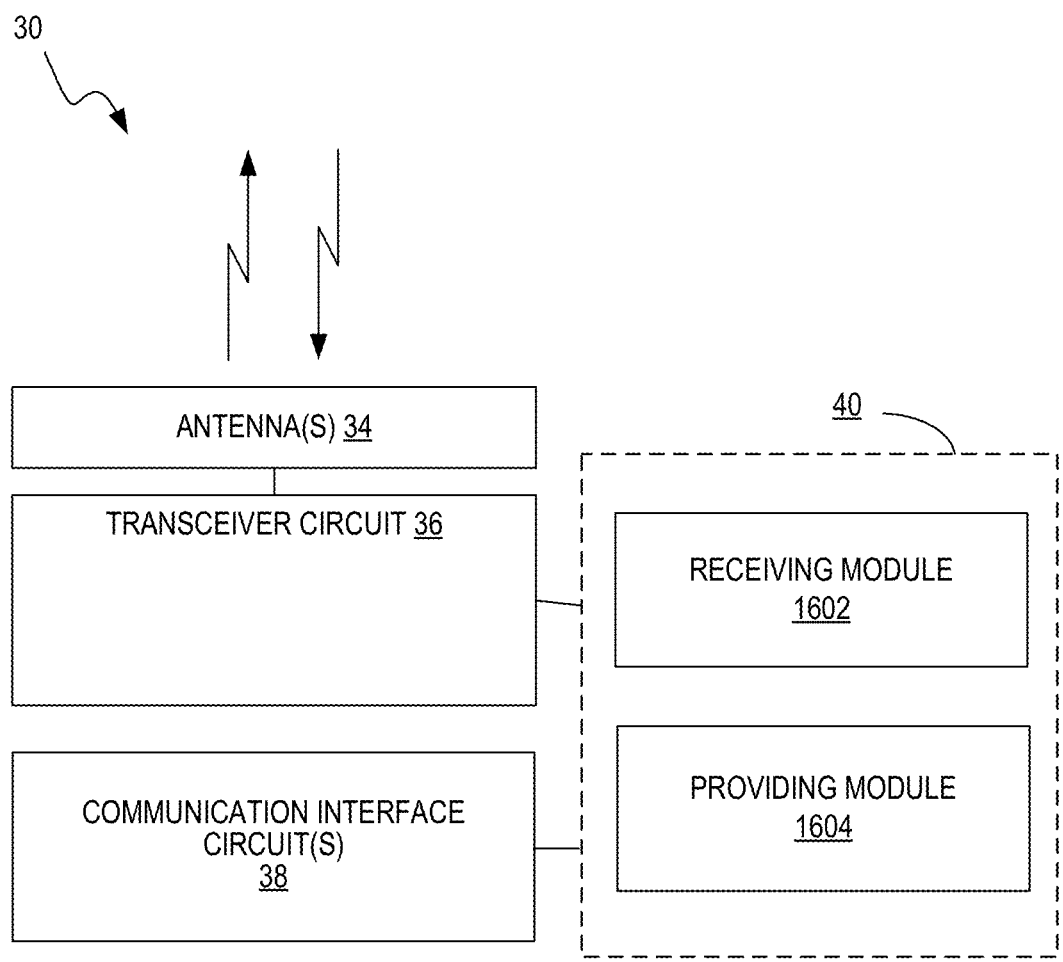
FIG. 16 illustrates a functional implementation of a synchronization source node, according to some embodiments.

FIG. 16 illustrates an example functional module or circuit architecture as may be implemented in a synchronization source node 30, e.g., based on the synchronization circuitry 40. The illustrated embodiment at least functionally includes a receiving module 1602 for receiving a service request from a network node for a synchronization service to be provided to the target network access node, wherein the service request comprises service information to enable the source network access node to provide the synchronization service to the target network access node. The implementation also includes a providing module 1604 for providing synchronization source information towards the network node, using the service information.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in a network node, for arranging a synchronization service for a target network access node, comprising:
receiving a service request from the target network access node for a synchronization service to be provided to the target network access node,
wherein the service request comprises service information related to the target network access node's synchronization needs;
selecting a synchronization source node, responsive to the service request,
wherein the selecting of the synchronization source node is based on the service information; and
sending a response towards the target network access node regarding the synchronization service to be provided by the synchronization source node.

2. A method, in a network access node in a wireless communication network, for synchronizing communications in the wireless communication network, comprising:
requesting, via a service request, a synchronization service from a network node,
wherein the service request comprises service information related to the network access node's synchronization needs;
receiving synchronization source information corresponding to the synchronization service; and
using the synchronization source information to detect and measure signals from a synchronization source node, for synchronization.

3. The method of claim 2, wherein the service information comprises one or more of: a location of a transmission point of the target cell for which the request is initiated; a required accuracy; potential muting pattern options; supported frequency bands; a required synchronization update periodicity; a desired number of backup synchronization sources; and a level of current synchronization or synchronization stratum level.

4. A method, in a source network access node for providing a synchronization service to a target network access node, comprising:
receiving a service request from a network node for a synchronization service to be provided to the target network access node, wherein the service request comprises service information to enable the source network access node to provide the synchronization service to the target network access node;
negotiating with the network node to determine the synchronization service to be used by the source network access node to provide synchronization source information to the target network access node; and
providing synchronization source information towards the network node, using the service information.

5. A network node in a wireless communication network, configured to arrange a synchronization service for a target network access node, comprising a processing circuit configured to:
receive a service request from the target network access node for a synchronization service to be provided to the target network access node,
wherein the service request comprises service information related to the target network access node's synchronization needs;
select a synchronization source node, responsive to the service request,
wherein the processing circuit is configured to select the synchronization source node based on the service information; and send a response towards the target network access node regarding the synchronization service to be provided by the synchronization source node.

6. The network node of claim 5, wherein the service information comprises information for at least one of: an identifier of the target network access node; a location of a transmission point of the target cell for which the request is initiated; a required accuracy; potential muting pattern options; supported frequency bands; a required synchronization update periodicity; a desired number of backup synchronization sources; and a level of current synchronization or synchronization stratum level.

7. The network node of claim 5, wherein the processing circuit is configured to select the synchronization source node by receiving service information from a plurality of candidate synchronization source nodes and selecting the synchronization source node from among the plurality of candidate synchronization source nodes based on the received service information.

8. The network node of claim 7, wherein the service information for each candidate synchronization source node comprises identification information for a main synchronization source and alternative synchronization sources, and wherein the processing circuit is configured to select the synchronization source node from among the plurality of candidate synchronization source nodes based on the respective identification information for each of the plurality of synchronization source nodes.

9. The network node of claim 7, wherein the service information for each candidate synchronization source node comprises an estimated accuracy of the respective synchronization signal, and wherein the processing circuit is configured to select the synchronization source node from among the plurality of candidate synchronization source nodes based on the estimated accuracy of the respective synchronization signal for each of the plurality of candidate synchronization source nodes.

10. The network node of claim 7, wherein the service information for each candidate synchronization source node comprises compensation information to compensate for propagation delays in the respective synchronization signal, and wherein the processing circuit is configured to select the synchronization source node from among the plurality of candidate synchronization source nodes based on the respective compensation information for each of the plurality of candidate synchronization source nodes.

11. A network access node configured to synchronize communications in a wireless communication network, comprising a processing circuit configured to:
request, via a service request, a synchronization service from a network node,
wherein the service request comprises service information related to the network access node's synchronization needs;
receive synchronization source information corresponding to the synchronization service; and
use the synchronization source information to detect and measure signals from a synchronization source node, for synchronization.

12. The network access node of claim 11, wherein the service information comprises one or more of: a location of a transmission point of the target cell for which the request is initiated; a required accuracy; potential muting pattern options; supported frequency bands; a required synchronization update periodicity; a desired number of backup synchronization sources; and a level of current synchronization or synchronization stratum level.

13. The network access node of claim 11, wherein the synchronization source information comprises at least one of: a location of a source cell of the selected synchronization source node and a frequency band.

14. The network access node of claim 11, wherein the synchronization source information comprises at least one of:
compensation information to compensate for propagation delays;
information for main synchronization sources;
information for a list of alternative or backup synchronization sources available to the synchronization source node;
beam identifiers for beams supported by the synchronization source node;
beam quality information;
a stratum level;
a synchronization signal made available by a base station;
an estimated accuracy towards synchronization sources based on one or more of: target node reporting, propagation delay estimates, and synchronization source properties;
synchronization reference signal information, including one or more of: a positioning reference signal, PRS, an applicable synchronization reference signal, a periodicity, a pattern, muting, consecutive PRS subframes, and bandwidth;
offset estimates for propagation delay offset compensation; and
an error estimate with respect to a geolocation of the network access node and/or the synchronization source node.

15. A source network access node configured to provide a synchronization service to a target network access node, comprising a processing circuit configured to:
receive a service request from a network node for a synchronization service to be provided to the target network access node, wherein the service request comprises service information to enable the source network access node to provide the synchronization service to the target network access node;
negotiate with the network node to determine the synchronization service to be used by the source network access node to provide synchronization source information to the target network access node; and
provide synchronization source information towards the network node, using the service information.

16. The method of claim 1, wherein the service information comprises information for at least one of: an identifier of the target network access node; a location of a transmission point of the target cell for which the request is initiated; a required accuracy; a potential muting pattern options; supported frequency bands; a required synchronization update periodicity; a desired number of backup synchronization sources; and a level of current synchronization or a synchronization stratum level.

17. The method of claim 4, wherein the service information comprises one or more of: a location of a transmission point for the target cell for which the request is initiated; a required accuracy; potential muting pattern options; supported frequency bands; a required synchronization update periodicity; desired number of backup synchronization sources; and a level of current synchronization or synchronization stratum level.

* * * * *